May 13, 1930.  P. WIESSNER  1,758,097
DYNAMOMETRIC MEASURING INSTRUMENT
Filed March 1, 1928
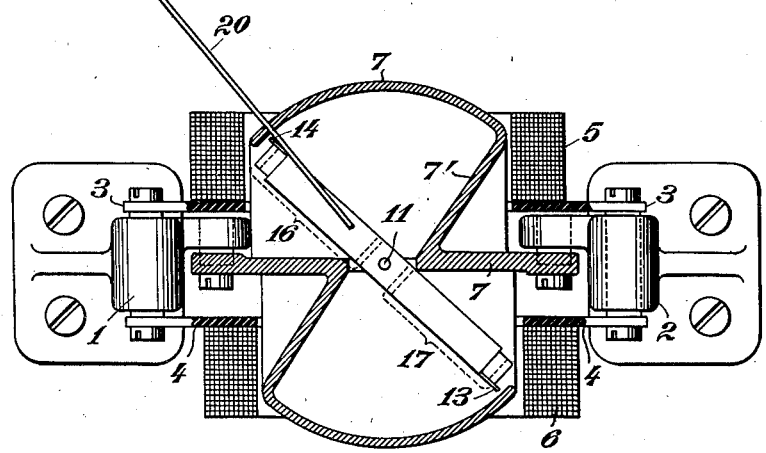
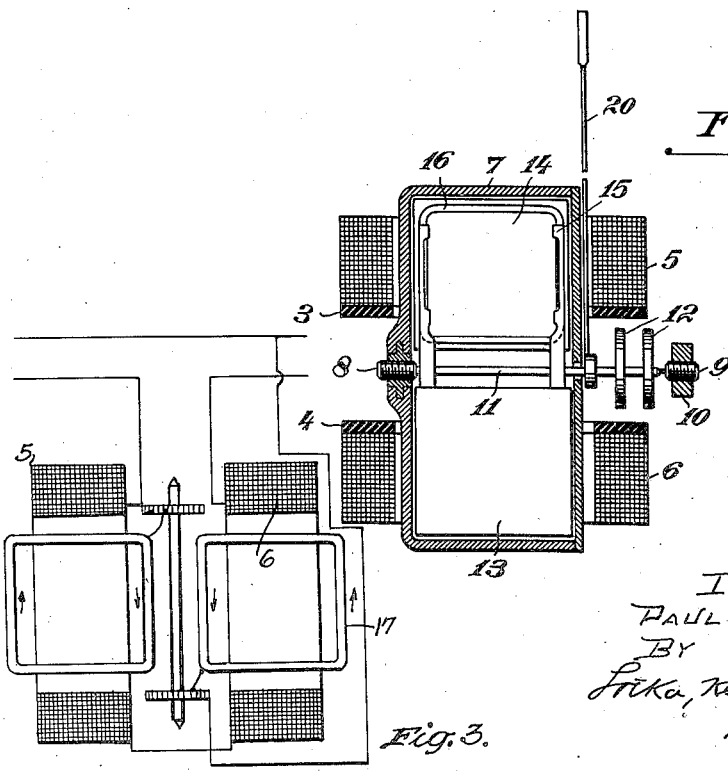
INVENTOR
PAUL WIESSNER
BY
ATTORNEYS.

Patented May 13, 1930

1,758,097

UNITED STATES PATENT OFFICE

PAUL WIESSNER, OF BERLIN, GERMANY, ASSIGNOR TO SIEMENS & HALSKE, AKTIEN-GESELLSCHAFT, OF SIEMENSSTADT, NEAR BERLIN, GERMANY, A CORPORATION OF GERMANY

DYNAMOMETRIC MEASURING INSTRUMENT

Application filed March 1, 1928, Serial No. 258,192, and in Germany March 3, 1927.

This invention relates to a dynamometric measuring set.

For high precision direct and alternating current measurements, use can only be made of dynamometric measuring sets, since their indications are largely independent of the type of current to be measured. Furthermore very much is demanded of them in other respects, more particularly for power measurements: an absolutely uniform division of the scale, an extremely high sensitivity, in spite of the weak natural field of the ironless coils, and, finally, insensitiveness against foreign fields.

In order to meet the requirements indicated above, the simple form of the dynamometric measuring set, consisting of a rigidly mounted coil and another coil pivoted within it, has been abandoned. Either two measuring sets placed above one another have been used or the shape of the measuring set itself has been made very complicated, even to the point of impracticability. On the one hand the rigidly mounted field coils were placed in obliquity, on the other hand use was made of movable coils which could not be manufactured without difficulty, because after having been wound they had to be shaped into simple forms, which process involved for the insulating compounds the danger of being crushed and, in addition, a subsequent warping due to the working of the coil material. Of course such complicated arrangement is not sufficiently uniform for the individual measuring sets, which moreover become very expensive. The astatic wattmeters having their measuring sets placed above one another are equally difficult to construct, since the common shaft of their movable coils must penetrate into the fixed field coils.

Hence the dynamometric precision measuring sets, known up to the present, did not meet the requirement that measuring instruments should be simple in construction and capable of being manufactured in quantities.

According to the invention, it is, however, possible to realize a considerable technical improvement involved in the constructional simplification and reduction in price, without disregarding the other demands made on dynamometric precision measuring sets. This is achieved in that use is made of simple fixed field coils, having flat, planar faces, and of interacting simple and, consequently, accurately manufactured former coils, provision being made for two fixed coils being spaced apart in such a way that the distance between the adjacent side planes is equal to or greater than the coil width measured in the axial direction.

This results in a very convenient mounting of the movable system, for between the two fixed coils space is provided for the bearing pedestal. Moreover, the movable system itself may be made part of an air damping device, whose rigidly mounted chamber can be arranged between the fixed coils, due to the arrangement of those indicated above. For the movable system, use can be made of two moving coils placed side by side and rigidly interconnected. The total diameter should preferably be equal to the mean winding diameter of the fixed coils, variations of ±20% being permissible. The space left between the fixed coils on the one hand, and the movable coil on the other hand should preferably be made equal to or less than ⅕ of the internal coil height. A good magnetic coupling and, consequently, a high torque is thereby obtained. The coil dimensions permit of realizing favourable scale divisions. The movable frames and the fixed coils are connected astatically in a manner well known in order to make the indications largely independent of foreign fields.

Figures 1 and 2 in the drawing illustrate by way of example an embodiment of the invention, and show a top and a side view thereof, partly in cross-section; while Fig. 3 shows the astatic arrangement of the movable coils. At the two bearing pedestals, the two rectangular field coils 5, 6 fastened to the pressboard discs 3, 4 are connected in parallel and, preferably, in order to act on the scale, slightly shifted in their relative positions. The distance separating them, measured between the adjacent limiting planes, is superior to the width of a coil measured in the axial direction. On the bearing pedestals 1 and 2 there is furthermore fitted a member 7, consisting of two opposite cylindrical portions with base, cover and two radially running walls 7', so as to form two chambers having the shape of cylinder sectors. The bearing screw 8 for the shaft 11 of the movable system is inserted at the bottom of this member 7, whereas the other bearing screw 9 is fitted in the bridge 10, bridging the two bearing pedestals 1 and 2, which is only represented in cross-section. To the shaft 11, acted on by two springs 12 in a well-known manner, there are fastened two aluminum sheets 13, 14 filling in the sectional area of the chambers. These sheets are used for the air damping of the index. They carry, at the same time, the eccentrically mounted coil formers 16, 17, by means of bent fishplates 15. Fig. 2 shows only one of them, since the other is fitted on the side of the aluminum sheet that is not shown in the drawing. The total diameter of the two coils fastened to the aluminum sheet, measured across the outermost former sides, is equal to the mean diameter of the fixed field coils. Variations of ±20% are permissible.

Figure 3 in the drawing indicates the astatic arrangement of the coils and their connections so as to measure the power in a circuit.

The fixed coils 5, 6 have a current proportional to the main current and the moving coils (16, 17) have a current proportional to the pressure across the circuit. The windings are arranged in a manner so that the currents in the fixed coils flow in opposite directions as is indicated by the arrows. The currents in the moving coils flow also in opposite directions so that in the portions in neighbourhood of the common rotating shaft the current flows up, and in the outer portions flow down, or inversely.

I claim:

1. In an electrodynamometric measuring instrument, the combination of two fixed coils of rectangular cross-section disposed in parallel planes and connected to a source of current in such manner that the currents in the two coils flow in opposite directions to provide opposing magnetic fields, the adjacent faces of said coils being placed at a distance at least equal to the axial length of a coil, a rotatable shaft, and a pair of moving coils rigidly fixed side by side about said shaft and each projecting into and oscillating within one of the fixed coils, each of said movable coils being of such form and size and so arranged that it oscillates with the greater part of its surface within its associated fixed coil.

2. In an electrodynamometric measuring instrument, the combination of two fixed coils of substantially rectangular form disposed in parallel planes and connected to a source of current in such manner that the currents in the two coils flow in opposite directions to provide opposing magnetic fields, the adjacent faces of said coils being placed at a distance at least equal to the axial length of a coil, a rotatable shaft, and a pair of moving coils of substantially rectangular form rigidly fixed upon opposite sides of said shaft in such manner that each oscillates within one of the fixed coils, the over-all external diameter of said moving coils being equal to the mean diameter of the fixed coil within a variation of about ±20%.

3. In an electrodynamometric measuring instrument, the combination of two fixed coils of substantially rectangular form disposed in parallel planes and connected to a source of current in such manner that the currents in the two coils flow in opposite directions to provide opposing magnetic fields, the adjacent faces of said coils being placed at a distance at least equal to the axial length of a coil, a rotatable shaft, and a pair of moving coil of substantially rectangular form rigidly fixed upon opposite sides of said shaft in such manner that each oscillates within one of the fixed coils, the over-all external diameter of said moving coils being equal to the mean diameter of the fixed coil within a variation of about ±20%, and the distance between the fixed and moving coils measured in the direction of the shaft being not greater than 1/5 of the internal coil height.

4. In an electrodynamometric measuring instrument, the combination of two fixed coils of substantially rectangular form disposed in parallel planes and connected to a source of current in such manner that the currents in the two coils flow in opposite directions, the adjacent faces of said coils being placed at a distance at least equal to the axial length of a coil, a rotatable shaft, a pair of moving coils of substantially rectangular form rigidly fixed upon opposite sides of said shaft, whereby each of said moving coils oscillates within one of the fixed coils, a dampening chamber enclosing said moving coils, and a dampening vane secured to said movable coils.

In testimony whereof I affix my signature.

PAUL WIESSNER.